(12) United States Patent
Hamby et al.

(10) Patent No.: US 10,241,784 B2
(45) Date of Patent: *Mar. 26, 2019

(54) HIERARCHICAL DIRECTIVES-BASED MANAGEMENT OF RUNTIME BEHAVIORS

(71) Applicant: Microsoft Technology Licensing, LLC, Redmond, WA (US)

(72) Inventors: John Lawrence Hamby, Seattle, WA (US); David Charles Wrighton, Redmond, WA (US); Michal Strehovsky, Redmond, WA (US); Morgan Asher Brown, Bellevue, WA (US); Fadi Hanna, Bothell, WA (US); Turgut Isik, Bellevue, WA (US); Mircea Trofin, Sammamish, WA (US); Fatma Didem Gokbulut, Redmond, WA (US); Robert Yung-Yi Fu, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 186 days.

This patent is subject to a terminal disclaimer.

(21) Appl. No.: 15/424,939

(22) Filed: Feb. 6, 2017

(65) Prior Publication Data

US 2017/0147337 A1 May 25, 2017

Related U.S. Application Data

(63) Continuation of application No. 15/171,992, filed on Jun. 2, 2016, now Pat. No. 9,600,272, which is a (Continued)

(51) Int. Cl.
*G06F 9/455* (2018.01)
*G06F 8/73* (2018.01)
(Continued)

(52) U.S. Cl.
CPC .................. *G06F 8/73* (2013.01); *G06F 8/41* (2013.01); *G06F 8/427* (2013.01); *G06F 8/70* (2013.01);
(Continued)

(58) Field of Classification Search
CPC .............................................. G06F 8/00–8/54
See application file for complete search history.

(56) References Cited

U.S. PATENT DOCUMENTS 6,154,877 A 11/2000 Ramkumar et al.
6,305,012 B1 10/2001 Beadle et al.
(Continued)

FOREIGN PATENT DOCUMENTS

CN 1560740 A 1/2005
CN 1799029 A 7/2006
(Continued)

OTHER PUBLICATIONS

Micro Focus Ltd., "Chapter 9: COBOL System Interface (Cob)", https://supportline.microfocus.com/documentation/books/sx50/cycobc.htm, Archived Jan. 1, 2008, Retrieved Oct. 16, 2018 (Year: 2008).*

(Continued)

*Primary Examiner* — Chameli Das
*Assistant Examiner* — Joanne G Macasiano
(74) *Attorney, Agent, or Firm* — Ogilvie Law Firm

(57) ABSTRACT

Support for dynamic behavior is specified while reducing reliance on JIT compilation and large runtimes; semantic characteristics are selectively attached to types and type members outside source code. A directives document contains human-readable directives in a parsable format for submission to an innovative compiler. The directives specify whether a type T or type member M is required, optional, or prohibited in a runtime environment. Some reference an application, library, assembly, or namespace group, and (Continued)

others reference group components: type, type instantiation, method, method instantiation, field, property, or event. Some directives force a generic instantiation. Some directives indirectly reference a type through a parameter, type parameter, or generic directive. Some directives reference degrees to manage runtime activation of type instances, runtime introspection over types, reflection, and/or runtime or static serialization. Degrees may enable or disable types, instance constructors, property setters, property getters, fields, or all type members. Directives may be composed.

20 Claims, 4 Drawing Sheets

Related U.S. Application Data continuation of application No. 14/227,029, filed on Mar. 27, 2014, now Pat. No. 9,389,890.

(51) Int. Cl.
  *G06F 8/41*  (2018.01)
  *G06F 8/70*  (2018.01)
  *G06F 11/36*  (2006.01)

(52) U.S. Cl.
  CPC ........ *G06F 9/4552* (2013.01); *G06F 11/3612* (2013.01)

(56) References Cited

U.S. PATENT DOCUMENTS

| | | |
|---|---|---|
| 6,407,753 B1 | 6/2002 | Budinsky et al. |
| 6,637,025 B1 | 10/2003 | Beadle et al. |
| 7,716,246 B2 | 5/2010 | Pepin |
| 8,539,457 B2 | 9/2013 | Hamby et al. |
| 8,762,974 B1 | 6/2014 | Smith et al. |
| 9,116,712 B2 | 8/2015 | Miller et al. |
| 9,292,270 B2 | 3/2016 | Strehovsky et al. |
| 9,836,290 B2 | 12/2017 | Strehovsky et al. |
| 2005/0216885 A1 | 9/2005 | Ireland |
| 2007/0233668 A1 | 10/2007 | Osipov |
| 2008/0127070 A1 | 5/2008 | Barcia et al. |
| 2008/0127303 A1 | 5/2008 | Wrighton et al. |
| 2008/0147698 A1 | 6/2008 | Gustafsson et al. |
| 2008/0288547 A1 | 11/2008 | Brodsky et al. |
| 2009/0055808 A1 | 2/2009 | Stoodley |
| 2009/0193392 A1 | 7/2009 | Downen et al. |
| 2009/0319554 A1 | 12/2009 | Krishnaswamy et al. |
| 2009/0328012 A1 | 12/2009 | Aharoni et al. |
| 2010/0088665 A1 | 4/2010 | Langworthy et al. |
| 2010/0088672 A1 | 4/2010 | Langworthy et al. |
| 2010/0095284 A1 | 4/2010 | Herring et al. |
| 2010/0125558 A1 | 5/2010 | Trofin et al. |
| 2010/0299300 A1 | 11/2010 | Wolf et al. |
| 2011/0296381 A1 | 12/2011 | Mooney |
| 2011/0307520 A1 | 12/2011 | Trofin et al. |
| 2011/0314460 A1 | 12/2011 | Wischik et al. |
| 2012/0060148 A1 | 3/2012 | Jones et al. |
| 2012/0210300 A1 | 8/2012 | Trofin et al. |
| 2012/0323858 A1 | 12/2012 | Nagarkar et al. |
| 2013/0103651 A1 | 4/2013 | Jha et al. |
| 2013/0263099 A1 | 10/2013 | Box et al. |
| 2013/0339928 A1 | 12/2013 | Trofin et al. |
| 2014/0082597 A1 | 3/2014 | Chafi et al. |
| 2014/0123134 A1 | 5/2014 | Charters et al. |
| 2015/0277881 A1 | 10/2015 | Strehovsky et al. |
| 2016/0147513 A1 | 5/2016 | Strehovsky et al. |

FOREIGN PATENT DOCUMENTS

| | | |
|---|---|---|
| CN | 103608774 A | 2/2014 |
| CN | 103608802 A | 2/2014 |
| EP | 1395903 A1 | 3/2004 |
| WO | 02103517 A1 | 12/2002 |

OTHER PUBLICATIONS

Oracle Corp., "JEP 165: Compiler Control", https://openjdk.java.net/jeps/165, Archived May 13, 2013, Retrieved Oct. 16, 2018 (Year: 2013).*

Lesnicki, et al., "Split Compilation: an Application to Just-in-Time Vectorization", In International Workshop on GCC for Research in Embedded and Parallel Systems, Sep. 2007, 7 pages.

Lyon, Douglas, "Semantic Annotation for Java", In Journal of Object Technology, vol. 9, Issue 3, May 2010, 11 pages.

Pawlak, Renaud, "Spoon: Compile-time Annotation Processing for Middleware", Nov. 2006, 21 pages.

Giacobazzi, et al., "Generalized Semantics and Abstract Interpretation for Constraint Logic Programs", In Journal of Logical Programming, vol. 25, Issue 3, Dec. 1995, 60 pages.

Giacobazzi, Roberto, "'Optimal' Collecting Semantics for Analysis in a Hierarchy of Logic Program Semantics", In Proceedings of the 13th International Symposium on Theoretical Aspects of Computer Science (STACS), Feb. 22, 1996, 12 pages.

Kiyavitskaya, et al., "Semi-Automatic Semantic Annotations for Web Documents", In Proceedings of 2nd Italian Semantic Web Workshop, 2005, 15 pages.

Chiba, et al., "An Easy-to-Use Toolkit for Efficient Java Bytecode Translators", In Proceedings of the 2nd International Conference on Generative Programming and Component Engineering, Sep. 22, 2003, 14 pages.

Fahndrich, et al., "Reflective Program Generation with Patterns", In Proceedings of the 5th International Conference on Generative Programming and Component Engineering, Oct. 22, 2006, 10 pages.

Chisnall, David, "Smalltalk in a C World", In Proceedings of the International Workshop on Smalltalk Technologies, Aug. 28, 2012, 12 pages.

"MethodBase.Invoke Method (Object, Object☐)", retrieved from <<http://msdn.microsoft.com/en-us/library/a89hcwhh(v=vs.110).aspx>>, no later than Mar. 17, 2014, 5 pages.

"Dynamic Programming in the .NET Framework", retrieved from <<http://msdn.microsoft.com/en-us/library/hh156524(v=vs.110).aspx>>, no later than Mar. 5, 2014, 18 pages.

"Limitations | Xamarin", retrieved from <<http://docs.xamarin.com/guides/ios/advanced_topics/limitations/>>, copyright 2013, 3 pages.

"Reflection in .NET—CodeProject", retrieved from <<http://www.codeproject.com/Articles/55710/Reflection-in-NET>>, Feb. 9, 2010, 15 pages.

"How to: Use Svcutil.exe to Export Metadata from Compiled Service Code", retrieved from <<http://msdn.microsoft.com/en-us/library/aa702581(v=vs.110).aspx>>, Aug. 2, 2012, 4 pages.

"Dynamic vs Static Compiler (JavaScript)", retrieved from <<http://www.4mghc.com/threads/289411-Dynamic-vs-Static-Compiler-JavaScript>>, Feb. 24, 2014, 3 pages.

Laurence Tratt, "Dynamically Typed Languages", retrieved from <<http://eprints.bournemouth.ac.uk/10668/1/tratt_dynamically_typed_languages.pdf>>, Mar. 13, 2009, 33 pages.

Raverdy P-G et al: "Reflection support for adaptive distributed applications", Enterprise Distributed Object Computing Conference, 1999. EDOC '99. Proceedings. Third International Mannheim, Germany Sep. 27-30, 1999, Piscataway, NJ, USA,IEEE, US, Sep. 27, 1999 (Sep. 27, 1999), pp. 28-36, XP01 0351700, ISBN: 978-0-7803-5784-6.

Brendan Gowing et al: "Meta-Object Protocols for C++: The Iguana Approach", Proceedings of Reflection '96, Apr. 1, 1996 (Apr. 1, 1996), pp. 1-16, XP055188021, Retrieved from the Internet: URL: http://edepositireland.ie/bitstream/handle/2262/32390/meta1.pdf?sequence=1 &isAllowed=y.

(56) References Cited

OTHER PUBLICATIONS

International Search Report and Written Opinion, PCT/US2015/022105, dated Jun. 1, 2015, 14 pages.
SimoTime Enterprises, "Directives for COBOL", http://www.simotime.com/dirpil01.htm, Published Feb. 3, 2012, Retrieved Mar. 5, 2016.
OpenJDK, "JEP 165: Compiler Control", http://openjdk.java.net/jeps/165, Published Dec. 21, 2011, Retrieved Mar. 5, 2016.
SnapLogic, "Snap Installer", http://www.snaplogic.com/docs/snap-developer/snap-installer.htm, Published Nov. 7, 2013, Retrieved Oct. 30, 2016.
Microfocus, "Chapter 9: COBOL System Interface", http://supportline.microfocus.com/Documentation/books/sx50/cycobc.htm, Published Oct. 20, 2008, Retrieved Oct. 30, 2016.
"Notice of Allowance Issued in European Patent Application No. 15715059.0", dated Jun. 15, 2018, 8 Pages.
"Office Action Issued in European Patent Application No. 15715060.8", dated May 30, 2018, 5 Pages.
Martin, et al., "Reducing Startup Time of a Deterministic Virtualizing Runtime Environment", In Proceedings of the 16th international Workshop on software and compilers for Embedded systems, Jun. 19, 2013, pp. 48-57.
"International Preliminary Report on Patentability Issued in PCT Patent Application No. PCT/US2015/022106", dated Mar. 2, 2016, 8 Pages.
"International Search Report and Written Opinion Issued in PCT Patent Application No. PCT/US2015/022106", dated Jun. 1, 2015, 15 Pages.
"Second Written Opinion Issued in PCT Application No. PCT/US2015/022106", dated Dec. 7, 2015, 7 Pages.
Zhao, et al., "The HipHop compiler for PHP", In Proceedings of the ACM SIGPLAN Notices, vol. 47, Issue 10, Oct. 19, 2012, 11 Pages.
"Pre-Interview First Office Action Issued in U.S. Appl. No. 14/227,029", dated Apr. 22, 2015, 6 Pages.
"Notice of Allowance Issued in U.S. Appl. No. 14/227,029", dated Mar. 15, 2016, 13 Pages.
"Notice of Allowance Issued in U.S. Appl. No. 14/227,029", dated May 19, 2016, 4 Pages.
"Notice of Allowance Issued in U.S. Appl. No. 15/171,992", dated Nov. 4, 2016, 10 Pages.
"International Preliminary Report on Patentability Issued in PCT Application No. PCT/US2015/022105", dated Mar. 2, 2016, 7 Pages.
"Second Written Opinion Issued in PCT Application No. PCT/US2015/022105", dated Dec. 7, 2015, 6 Pages.
"First Office Action and Search Report Issued in Chinese Patent Application No. 201580016645.7", dated Dec. 4, 2018, 12 Pages.
"First Office Action and Search Report Issued in Chinese Patent Application No. 201580016821.7", dated Jan. 8, 2019, 10 Pages.

\* cited by examiner

EXAMPLES OF PARAM
RUNTIME BEHAVIOR CHARACTERISTIC DIRECTIVES 204, 214

PARAMETER DIRECTIVE(S) 302

TYPEPARAMETER DIRECTIVE(S) 304

GENERICPARAMETER DIRECTIVE(S) 306

Fig. 3

EXAMPLES OF GROUP
RUNTIME BEHAVIOR CHARACTERISTIC DIRECTIVES 204, 216

APPLICATION DIRECTIVE(S) 402

LIBRARY DIRECTIVE(S) 404

ASSEMBLY DIRECTIVE(S) 406

NAMESPACE DIRECTIVE(S) 408

Fig. 4

EXAMPLES OF DIRECTIVE DEGREES 212 HAVING VALUES 502

ACTIVATION DEGREE 504     BROWSE DEGREE 506

RUNTIME SERIALIZATION DEGREE 508

DYNAMIC REFLECTION DEGREE 510

STATICALLY SYNTHESIZED SERIALIZATION DEGREE(S) 512

Fig. 5

HIERARCHICAL DIRECTIVES-BASED MANAGEMENT OF RUNTIME BEHAVIORS

RELATED APPLICATIONS

The present application claims priority to, and is a continuation of, U.S. patent application Ser. No. 15/171,992 filed Jun. 2, 2016, which claims priority to, and is a continuation of, U.S. patent application Ser. No. 14/227,029 filed Mar. 27, 2014, now U.S. Pat. No. 9,389,890 issued Jul. 12, 2016, and the present application incorporates by reference herein the entirety of each of said applications.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

INCORPORATION BY REFERENCE

To the extent permitted by applicable law in the relevant jurisdiction, the present disclosure incorporates herein by reference the entirety of commonly owned U.S. patent application Ser. No. 15/171,992 filed Jun. 2, 2016 ("the '992 application") and the entirety of commonly owned U.S. patent application Ser. No. 14/227,036 filed Mar. 27, 2014 ("the '036 application").

BACKGROUND

Some computer program environments provide runtime support for one or more dynamic behaviors. Some dynamic behaviors include dynamic dispatch, reflection, downcasting, self-modifying code, dynamic type-checking, and/or just-in-time compilation. Dynamic dispatch involves selecting at runtime which implementation of a polymorphic method (or function) is called from a given invocation. Type introspection involves a running program examining its own values, metadata, properties, and/or functions; reflection goes further because it involves a running program altering its own values, metadata, properties, and/or functions. Downcasting or type refinement involves casting a reference of a base class to a derived class of the base class. Self-modifying involves a program modifying its own code at runtime. Dynamic type-checking involves verifying type-safety of a program while the program is running. Just-in-time (JIT) compilation involves compiling code for a program while the program is running; the compiled code may be native code or it may be higher-level code which is then interpreted, for example. Some dynamic programming languages execute program behaviors at runtime that are performed instead during compilation for static programming languages, e.g., extending a program by adding new code, extending objects and their definitions, and/or modifying a type system.

Balancing dynamic and static features in an environment can be challenging. Balance is sometimes possible, in the sense that a program with dynamic behaviors may also have features such as static type-checking, static compilation, and/or creation of an executable application all of whose components have been identified during an ahead-of-time compilation before the application begins execution. Dynamic features can provide flexibility and power which is missing from familiar statically compiled programs. In many situations, however, static compilation of a program permits a smaller and less complex runtime, and provides greater certainty about the program's behavior during testing and/or when checking the program for malware. Accordingly, new ways to balance static and dynamic functionality can be useful and concrete advances in computer programming.

SUMMARY

Consider the technical challenge of supporting dynamic behavior such as reflection while reducing or eliminating reliance on JIT compilation and large runtime platforms. In this context, types and type members of a computer program can be viewed as having "semantic characteristics" which specify, for example, whether the types and type members can be safely omitted from the program's runtime platform without risking an execution error. In the past, these semantic characteristics have either been unconditionally presumed because the runtime includes all dynamic types and type members (at potentially excessive resource costs), or the semantic characteristics have been specified by attribution of individual elements (which required substantial tedious details and typically also required access to the program's source code). Alternative approaches are presented herein.

Although the challenge of supporting reflection without JIT compilation spurred development of some aspects of some embodiments described herein, the present disclosure is limited neither to reflection support nor to the elimination of JIT compilation. For example, some embodiments are directed to the technical problem of selectively attaching semantic characteristics to types and type members of a computer program. Some embodiments are directed to the technical problem of reducing runtime requirements in target environments such as smartphones and tablets. Some embodiments are directed to the technical problem of expanding the capabilities of ahead-of-time compilation, in order to facilitate application testing. Some embodiments provide tools and techniques directed to the technical problem of managing metadata for reflection and other dynamic behaviors. Those of skill in the programming art will also recognize other technical problems addressed by the innovations described herein.

In some embodiments, a human or software process user obtains a directives document from digital storage. The directives document is intended to help manage runtime behavior characteristics of types and type members of a computer program in a runtime environment. The environment may be, for example, a smartphone or a tablet which has a reduced size runtime, relative to familiar runtimes. The computer program has a source code which is written in at least one data-typed programming language.

In some embodiments, the user may obtain the directives document by reading a directives document file that has already been generated, or the user can obtain the directives document by generating it, for example. The directives document contains human-readable directives in a format which is also parsable by software, such as an XML, JSON, YAML, or SDL format (these acronyms are defined in the Detailed Description below). Unlike approaches which annotate source code with semantic attributes, the directives of the directives document are not interleaved with the source code of the computer program to which the directives pertain. As a result, access to the source code is not necessarily required for effective use of the directives. In particular, the program's source code is not required in order to modify an applicable directives document by adding a directive, deleting a directive, or altering a directive. A given program may be subject to different directives documents, which are tailored for example to different runtimes.

Upon inspection by the user, the directives document discloses various runtime behavior characteristic directives. For example, a directive may specify that a type T of the computer program source code is a required type in the environment, or that T is an optional type in the environment, or that T is a prohibited type in the environment. Similarly, another directive may specify that a type member M of the computer program source code is a required type member in the environment, is optional, or is prohibited in the environment. In some cases, a directive specifies that a degree D is enabled for a type T in the environment, or that D is disabled, and in some cases a directive specifies that a degree D is enabled for a type member M in the environment, or that D is disabled for M in the environment.

In some embodiments, directives may reference a group of program items; some examples include the following group runtime behavior characteristic directives: an Application directive, a Library directive, an Assembly directive, a Namespace directive. In some embodiments, directives may reference components of a group, such as the following group component runtime behavior characteristic directives: a Type directive, a TypeInstantiation directive, a Method directive, a MethodInstantiation directive, a Field directive, a Property directive, an Event directive. In some embodiments, directives can force the existence of a generic instantiation, provided the compiler given the directives complies with the directives. In some embodiments, directives may make indirect reference to types; some examples include the following param runtime behavior characteristic directives: a Parameter directive, a TypeParameter directive, a GenericParameter directive.

In some embodiments, directives may be able to reference one or more of the following degrees: an activation degree which refers to runtime activation of type instances via reflection; a browse degree which refers to allowing runtime introspection over types via reflection; a dynamic degree which refers to runtime access via reflection; a runtime serialize degree which refers to enabling reflection support for reflection-based serialization and/or deserialization; or a static serialize degree with refers to statically synthesized serialization in a particular format such as XML or JSON. In some embodiments, permitted degree values include two or more of the following: Required-All, Required-PublicAndInternal, Required-Public, All, PublicAndInternal, Public, Included, Auto, or Excluded. Within a given embodiment and environment, degrees may apply to types, their instance constructors, their property setters, their property getters, fields, and/or all type members. In some embodiments, degrees are automatically propagated through related types and type members.

In some embodiments, directives are submitted to an ahead-of-time compiler to indicate the following for use during compilation: (a) whether degree D applies to type T, (b) whether degree D applies to type member M, (c) whether type T is required, and (d) whether type member M is required. If a type T or type member M is not required (at least according to the directives document), then the compiler and the runtime can reduce space and processing requirements accordingly by omitting dynamic support for T or for M, respectively. To determine what the submitted directives indicate for a given type T or a given type member M, the compiler in some embodiments finds all directives that apply to T (or to M, as the case may be), applies composition rules to produce a composite directive, and then determines the result from the composite directive. The compiler then compiles at least a portion of the computer program source code into native code as directed by the directives document.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 3 is a block diagram further illustrating param runtime behavior characteristic directives in some embodiments consistent with that aspect of FIG. 2;

FIG. 4 is a block diagram further illustrating group runtime behavior characteristic directives in some embodiments consistent with that aspect of FIG. 2;

FIG. 5 is a block diagram further illustrating runtime behavior characteristic directive degrees in some embodiments consistent with that aspect of FIG. 2;

DETAILED DESCRIPTION

Overview

Figure 1:
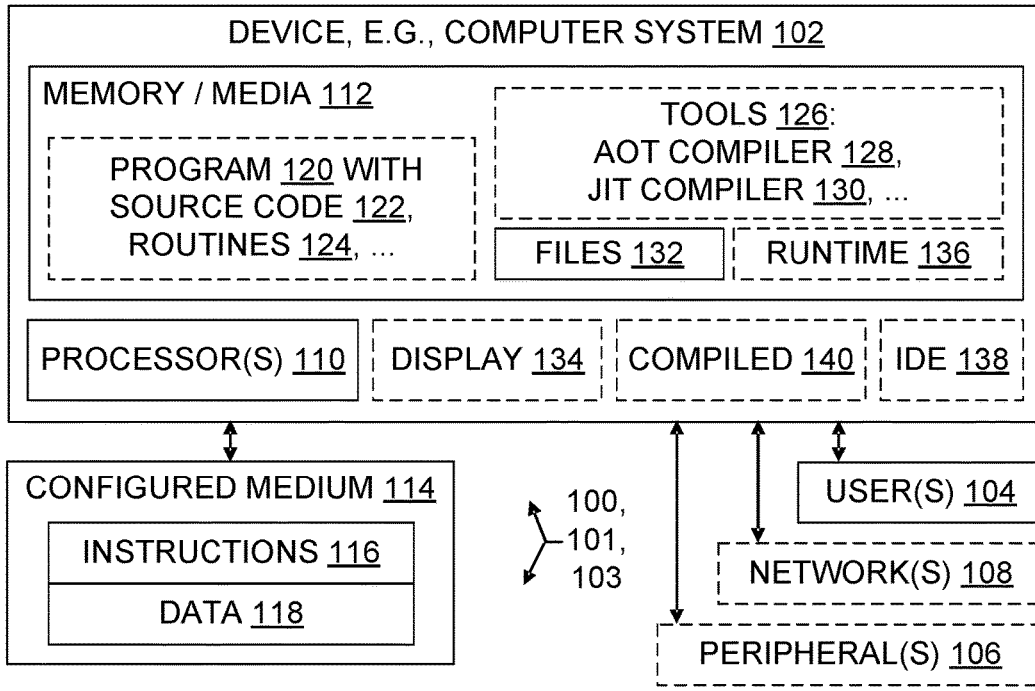
FIG. 1 is a block diagram illustrating a computer system having at least one processor and at least one memory which interact with one another under the control of software for managing runtime behavior characteristics of types and type members of a computer program in a target runtime environment, the target runtime environment not necessarily being the same environment as a compilation environment in which the computer program has been compiled, is being compiled, or will be compiled, with FIG. 1 also illustrating other items in an operating environment which may be present on multiple network nodes, and with FIG. 1 also illustrating configured storage medium (as opposed to mere signal) embodiments, and with the operating environment being illustrative of the compilation environment and also illustrative of the target runtime environment.

Some aspects of innovations described herein arose in response to challenges posed by the technical problem of providing reflection semantics with an ahead-of-time compilation system that will produce small and fast binaries, when an implementation of those reflection semantics is not provided by an execution engine (i.e., by a runtime). However, the innovations are also applicable outside that original context.

Some embodiments provide or utilize a software-parsable data formatting language tailored for attaching semantic characteristics to types and type members of a computer program. In some embodiments the software-parsable data formatting language is a markup language such as XML, and in some it is a data serialization standard such as YAML. The software-parsable data formatting languages are also collectively referred to herein as "formats" or "format languages." Directive documents written in a format language are separate from a program's original source code, but are employed in the compilation or interpretation of that source code into managed code assemblies, libraries, and the like. The compilation or interpretation refers to directives written in the language to determine whether to apply semantic characteristics to specific types and/or type members. The semantic characteristics themselves are then enforced by a compiler, an interpreter, and/or a runtime library. A directives document written in the language thus controls semantic aspects of a compiler, interpreter, and/or runtime as applied to a particular program or library, without being entangled in the source code for that program or library.

In some embodiments, a directives document written in the language is a collection of hierarchical directives. Such directives are organized in a hierarchical structure relative to one another; the structure hierarchically reflects a combination of organizing concepts of programming languages used in the managed computer program's source code, e.g., by nesting namespaces and nesting types. In some embodiments, the source code will be compiled into single or multiple managed code assemblies. This hierarchical organization allows for directives that apply to entire applications, libraries, namespaces across assemblies, groups of assemblies, specific assemblies, namespaces within assemblies, individual types, and/or individual members of types. Such directives provide for control of runtime behavior characteristics at multiple levels within the hierarchy, giving a user the ability to refine or override characteristics at each of several levels.

In some embodiments, a "degree" is a name of a semantic characteristic. Directives in the language turn degrees on or off for types and/or for type members to which the directives apply. Degrees are orthogonal to one another, in the sense that specifying one degree in a directive has no effect on other degrees. If multiple directives apply to a type or type member, the degree is on or off for the type member according to rules for composing directives. This allows characteristics to be specified for elements of a library and for those characteristics to also be overridden when appropriate for an application's use of the library. It will be recognized from the present teachings that the set of degrees can also be extended or modified from the examples given herein.

In some embodiments, rules for applying and composing directives determine whether a given type or type member has a particular semantic characteristic. In some embodiments, some directives can make indirect reference to types, implying applications of degrees to types used in specific contexts. In some, directives can force specific instantiations of generic types or generic methods to exist at runtime.

One aspect of some innovations described herein is a concrete syntax. One illustrative concrete syntax utilizes XML, and it may thus be described and constrained by an XSD document consistent with teachings provided herein. A familiar compiler or interpreter may be modified by one of skill to parse XML directives documents, thereby recognizing semantics directives that are consistent with teachings herein. More generally, the present disclosure teaches an abstract syntax, namely, an English description of directives which supports illustrative rules for arranging, composing, and using directives. Example semantics of the directives definition language are given in English as an abstract syntax.

Some embodiments described herein may be viewed in a broader context. For instance, concepts such as behavior, compilation, execution, inspection, parameters, requirements, and types may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving behavior, compilation, execution, inspection, parameters, requirements, and/or types are outside the present scope. Accordingly, vagueness, mere abstractness, lack of technical character, and accompanying proof problems are also avoided under a proper understanding of the present disclosure.

Technical Character

The technical character of embodiments described herein will be apparent to one of ordinary skill in the art, and will also be apparent in several ways to a wide range of attentive readers. First, some embodiments address technical problems such as supporting reflection without JIT compilation, selectively attaching semantic characteristics to types and type members, reducing runtime requirements, expanding ahead-of-time compilation capabilities, and/or managing metadata for reflection and other dynamic behaviors. Those of skill will also recognize other technical problems addressed by the innovations described herein.

Second, some embodiments include technical components such as computing hardware which interacts with software in a manner beyond the typical interactions within a general purpose computer. For example, in addition to normal interaction such as memory allocation in general, memory reads and write in general, instruction execution in general, and some sort of I/O, some embodiments described herein include software for creating and/or using directives that are written in a format language and are designed to help manage runtime behavior characteristics.

Third, technical effects provided or influenced by some embodiments include the production of composite directives, the compelled existence of a generic instantiation, and compiler inclusion/exclusion of particular metadata in native code.

Fourth, some embodiments include technical adaptations such as directive degrees which are orthogonal to one another, and which operate within a hierarchy of directives.

Fifth, some embodiments support modified technical functionality of compilers by directives that influence technical considerations such as whether a particular type or type member is (a) required in a target runtime environment, (b) optional in that environment, or (c) prohibited in that environment.

Sixth, technical advantages of some embodiments include the ability to specify type and type member presence and/or absence without access to source code, reduced runtime sizes, reduced runtime processing workloads, and an improved opportunity to fully test an application's behavior before that application is released into a marketplace.

Some Acronyms

AOT: Ahead Of Time
API: Application Program Interface
CD: Compact Disc
DVD: Digital Video Disc or Digital Versatile Disc
ECMA: former European Computer Manufacturers Association; this acronym has been replaced by non-acronym "Ecma" of Ecma International.
JIT: Just In Time
JSON: JavaScript Object Notation
RAM: Random Access Memory
ROM: Read Only Memory
SDL: Simple Declarative Language
URI: Uniform Resource Identifier
XML: eXtensible Markup Language
XSD: XML Schema Definition
YAML: YAML Ain't Markup Language

SOME TERMINOLOGY

Reference is made below to exemplary embodiments such as those illustrated in the drawings, and specific language will be used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are defined explicitly, but quotation marks are not used when a term is defined implicitly. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, adding, allowing, altering, applying, avoiding, behaving, compiling, composing, containing, deleting, deserializing, directing, disabling, disclosing, enabling, executing, forcing, formatting, inspecting, interpreting, locating, maintaining, managing, modifying, obtaining, parsing, producing, prohibiting, reading, reciting, referring, requiring, serializing, storing, submitting, supporting, targeting, utilizing, writing, and accesses, accessed, adds, added, etc., with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise, "computer readable medium" means a computer readable storage medium, not a propagating signal per se.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

One of skill will appreciate that the foregoing aspects and other aspects presented herein under "Operating Environments" may also form part of a given embodiment. This document's headings are not intended to provide a strict classification of features into embodiment and non-embodiment feature classes.

As another example, a game may be resident on a Microsoft XBOX Live® server (mark of Microsoft Corporation). The game may be purchased from a console and it may be executed in whole or in part on the server, on the console, or both. Multiple users may interact with the game using standard controllers, air gestures, voice, or using a companion device such as a smartphone or a tablet. A given operating environment includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., desktop computer, server computer, smartphone, tablet, laptop, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In some of the illustrated environments 100, one or more applications or other programs 120 have source code 122 with routines 124 and other parts. Software development tools 126 such as ahead-of-time compilers 128, just-in-time compilers 130, debuggers, and profilers, assist with software development by producing and/or transforming source code 122 into native code, intermediate language code, and/or another compiled form 140. Source code 122 and other information is often stored in files 132 kept in nonvolatile storage 112, from which it is read into volatile working memory 112. More generally, the code 122, tools 126, and other items shown in the Figures and/or discussed in the text, may each reside partially or entirely within one or more hardware media 112, thereby configuring those media for technical effects which go beyond the "normal" (i.e., least common denominator) interactions inherent in all hardware-software cooperative operation. In addition to processors 110 (CPUs, ALUs, FPUs, and/or GPUs), memory/storage media 112, display(s) 134, and battery(ies), an operating environment may also include other hardware, such as buses, power supplies, wired and wireless network interface cards, and accelerators, for instance, whose respective operations are described herein to the extent not already apparent to one of skill. CPUs are central processing units, ALUs are arithmetic and logic units, FPUs are floating point processing units, and GPUs are graphical processing units.

The operating environment 100 is illustrative both of a compilation environment 101 in which a given program is compiled and of a target runtime environment 103 in which the compiled program executes, in the sense that each environment 100, 101, 103 includes processor(s) 110 and memory 112, and each environment 100, 101, 103 also often includes other items shown in FIG. 1. However, one of skill will understand that many programs are compiled in one environment and then executed in a different environment, so the mere fact that one Figure helps illustrate both environments 101 and 103 does not mean that everything present in one of those environments is necessarily present in the other. In particular, the compilation environment 101 will contain a static compiler 128 and source code 122 that are not necessarily present in the runtime environment 103, and the runtime environment 103 will contain a runtime 136 that is not necessarily present in the compilation environment 101.

A given compilation environment 101 may include an Integrated Development Environment (IDE) 138 which provides a developer with a set of coordinated software development tools 126 such as compilers, source code editors, profilers, debuggers, and so on. Some of the suitable operating environments 100 for some embodiments include or help create a Microsoft® Visual Studio® development environment (marks of Microsoft Corporation) configured to support program development. Some suitable operating 100 environments include Java® environments (mark of Oracle America, Inc.), and some include environments which utilize languages such as C++ or C# ("C-Sharp"), but teachings herein are applicable with a wide variety of programming languages, programming models, and programs, as well as with technical endeavors outside the field of software development per se.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment. FIG. 1 is provided for convenience; inclusion of an item in FIG. 1 does not imply that the item, or the describe use of the item, was known prior to the current innovations.

Systems

Figure 2:
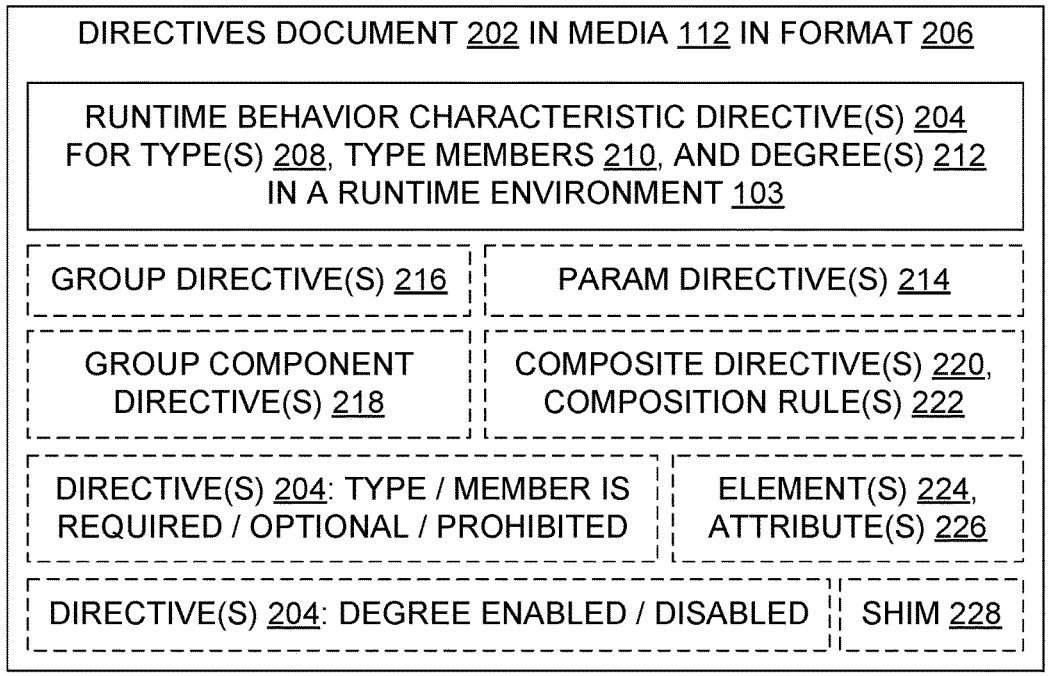
FIG. 2 is a block diagram illustrating aspects of runtime behavior characteristic management in an example architecture.

FIG. 2 helps illustrate aspects of an architecture which is suitable for use with some embodiments; other Figures are also referenced below. In one embodiment, a computer system 102 includes a logical processor 110 in the form of one or more single core and/or multicore processors, and a memory 112 in operable communication with the logical processor 112. The memory 112 includes RAM, a hard disk, and/or other volatile or non-volatile storage device(s). A computer program source code 122 resides in at least one source code file 132 in the memory. Unless stated otherwise, it is assumed herein that the source code 122 is free of conventional errors that would prevent compilation 814, such as programming language syntax errors, undefined identifiers, references to undeclared functions, static type violations, and so on. A static compiler 128, also referred to herein as an ahead-of-time compiler or an AOT compiler, is part of the system 102.

A directives document 202 resides in the memory 112 outside a compilation portion 640 of the computer program source code 122. The directives document 202 contains runtime behavior characteristic directives 204 which are written 620 in a human-readable software-parsable format 206. In some embodiments, the directives 204 are written in at least one of the following formats 206: an XML format, a JSON format, a YAML format, and/or an SDL format. When XML format or a syntactically similar format is used, the directives document 204 contains elements 224 and attributes 226; some examples are given later in this disclosure.

As used herein, "compilation portion" includes source code statements in at least one programming language 636, and in particular includes comments having delimiters defined by the programming language. Also, attributes defined according to the C# (C-sharp) programming language are within a compilation portion of the source code in which those attributes appear.

Because the directives document 202 resides outside any compilation portion 640 of the computer program source code 122, the source code and the directives document are not physically entangled, unlike the way C# attributes are entangled with other C# source code, for example. As a result of the separation between source code 122 and directives 204, the source code 122 can generally be utilized 634 in a conventional manner (albeit without obtaining advantages discussed herein) without any regard being given to the directives document 202 by a conventional IDE, conventional compiler, or other tools that do not recognize the directives document. But the source code 122 can also be compiled 814 by a suitably modified compiler in a manner that is subject to the directives 204 and according to the teachings herein, to obtain corresponding advantages such as increased control over runtime behavior characteristics of the program during its execution 816.

In some embodiments, the runtime behavior characteristic directives 204 include at least one of the following: a directive 204 to the compiler 128 that a type T of the computer program source code 122 is a required type 208, a directive 204 to the compiler 128 that a type T of the source code 122 is a prohibited type 208, a directive 204 to the compiler 128 that a type member M of the source code 122 is a required type member 210, or a directive 204 to the compiler 128 that a type member M of the source code 122 is a prohibited type member 210. In some embodiments, types 208 and/or type members 210 can also or alternatively be specified as optional through use of a directive 204.

In some embodiments, the directives 204 include at least one of the following: a directive 204 to the compiler 128 that a degree D is an enabled degree 212 for a type T, a directive 204 to the compiler that a degree D is disabled for a type T, a directive 204 to the compiler that a degree D is enabled for a type member M, or a directive 204 to the compiler that a degree D is disabled for a type member M.

During execution of a suitably enhanced compiler 128 by the logical processor(s) 110, the compiler 128 compiles 814 at least the compilation portion 640 of the computer program source code 122 from the source code file(s) 132 and/or intermediate language files 132 into at least one native code file 132 or other compiled 140 file, and does so as directed by the directives document 202. For example, when the directives 204 specify 802 that a dynamic degree is enabled for a type T, then one innovative compiler 128 generates a description of T's garbage collection layout and a list of T's implemented interfaces and maps that metadata to native code representing T. When directives 204 specify that another type T1 has a degree which disables reflection but permits introspection, this compiler 128 generates metadata with T's member names and their types but does not create a runtime mapping to native code or a description of T's garbage collection layout. This compiler 128 also generates trampoline code for interface methods and for virtual methods, for methods that have bounds checks when called, and for calling convention conversion between a reflection API and a called method's calling convention. Other examples and descriptions of compiler 128 activity or forbearance in response to directives 204 are provided in the '036 application identified above and incorporated herein by reference.

In some embodiments, the directives document 202 includes 804 at least one directive 204 which is one of the following param runtime behavior characteristic directives 214: a Parameter directive 302, a TypeParameter directive 304, or a GenericParameter directive 306. In some, the directives document 202 includes 804 at least one directive 204 which is one of the following group runtime behavior characteristic directives 216: an Application directive 402, a Library directive 404, an Assembly directive 406, or a Namespace directive 408. In some embodiments, the directives document 202 includes 804 at least one directive 204 which is one of the following group component runtime behavior characteristic directives 218: a Type directive 702, a TypeInstantiation directive 704, a Method directive 706, a MethodInstantiation directive 708, a Field directive 710, a Property directive 712, or an Event directive 714. Other kinds of directives 204 are also used 642 in some embodiments to control 806 runtime behavior characteristics via metadata, mappings to native code, and/or generation of trampoline code by a static compiler 128.

In some embodiments, the directives document 202 includes 804 at least one directive 204 which recites a degree 212 having a value 502. For example, in some embodiments an activation degree 504 refers to runtime activation of type instances. In some, a browse degree 506 refers to runtime introspection over types. In some, a runtime serialization degree 508 refers to runtime serialization and/or deserialization. In some, a dynamic reflection degree 510 refers to runtime access via reflection. In some, a statically synthesized serialization degree 512 refers to compile-time serialization and/or deserialization. In some embodiments, the directives have one or more of the following degree values 502: Required-All, Required-PublicAndInternal, Required-Public, All, PublicAndInternal, Public, Included, Auto, or Excluded.

In some embodiments, an innovative compiler 128 executes instructions 116 which apply at least one composition rule 222 to at least two runtime behavior characteristic directives 204 to produce a composite runtime behavior characteristic directive 220. Examples of composition rules 222 are provided later in this disclosure.

In some embodiments, an innovative compiler 128 executes instructions 116 which output native code 140 instantiating a generic parameter in response to at least one runtime behavior characteristic directive 306. Familiar generic instantiation technology may be used, but in this example that technology is controlled by an innovative directives document 202.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Many embodiments reside and operate on a single device, such as a particular smartphone, a particular tablet, or a particular laptop or workstation or server box. However, some more extensive embodiments operate in a "cloud" computing environment and/or a "cloud" storage environment in which computing services are not owned but are provided on demand. For example, the directives document 202 and the innovative AOT compiler guided by that document 202 may be on a development system 102 in a networked cloud, compiled code 140 may be stored in other devices (servers) within the cloud for presentation through an application marketplace, and the purchased/leased application program 120 may execute and configure the display on yet another cloud device 102 such as a consumer's smartphone or tablet.

Processes

Figure 6:
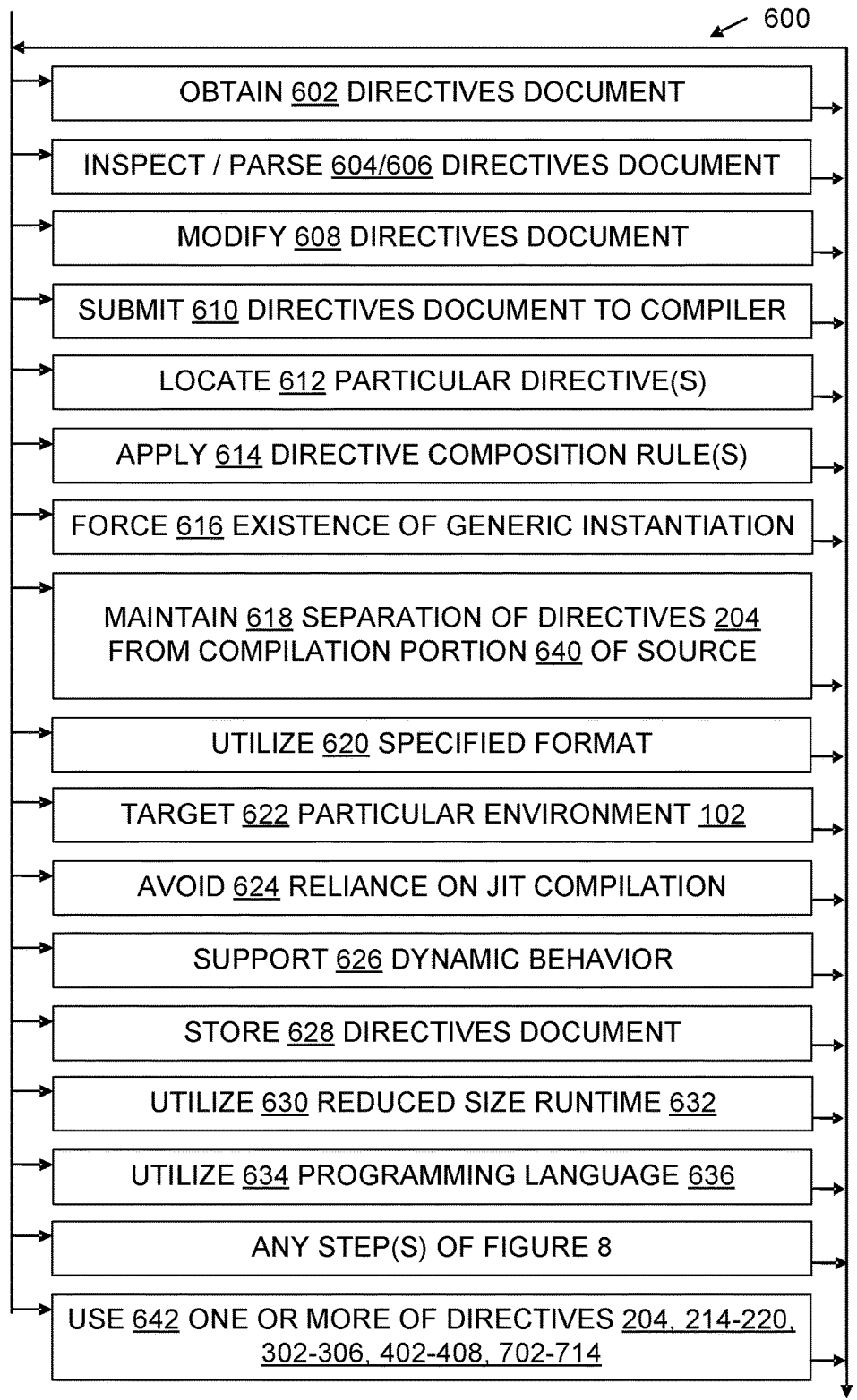
FIG. 6 is a flow chart illustrating steps of some process and configured storage medium embodiments described herein.
Figure 7:
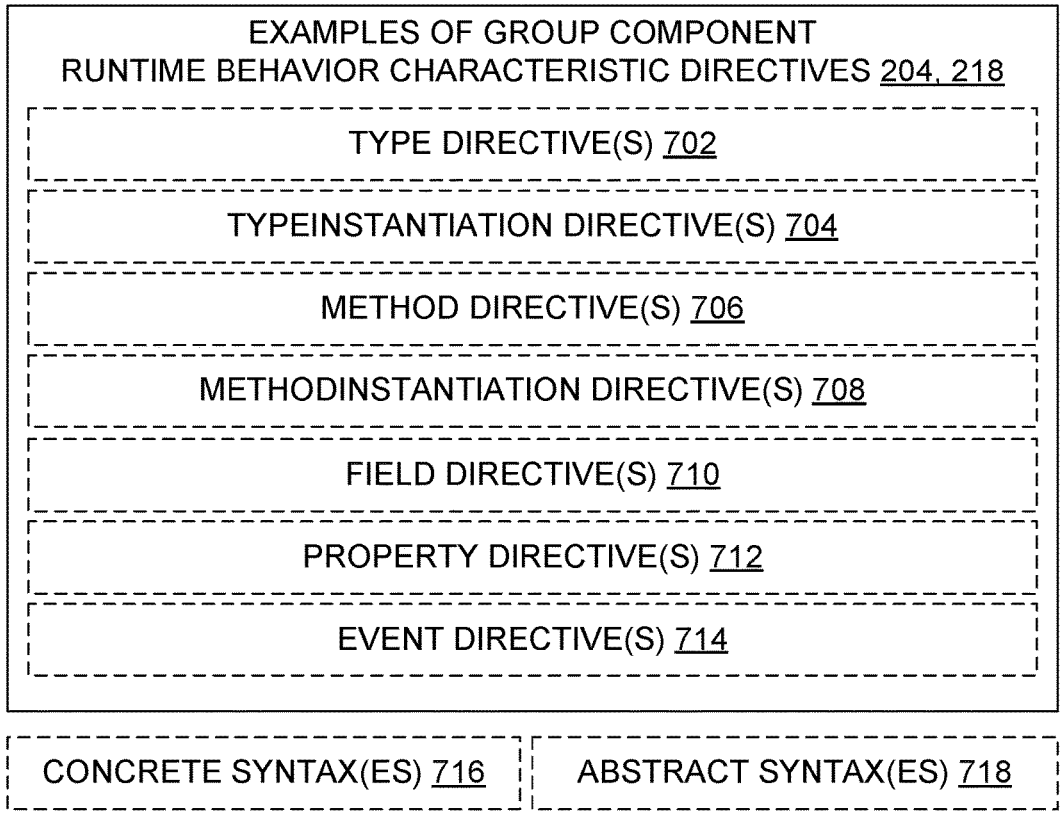
FIG. 7 is a block diagram further illustrating group component runtime behavior characteristic directives in some embodiments consistent with that aspect of FIG. 2.
Figure 8:
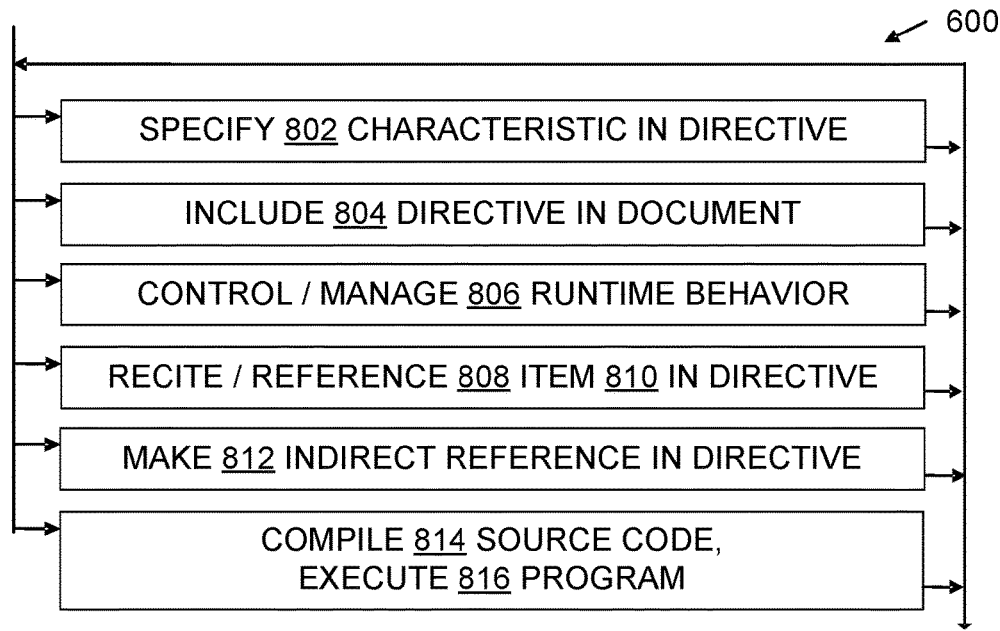
FIG. 8 is a continuation of the FIG. 6 flow chart.

FIG. 6 and FIG. 8 collectively illustrate some process embodiments in a flowchart 600. Technical processes shown in the Figures or otherwise disclosed may be performed in some embodiments automatically, e.g., by a compiler 128 under control of a directives document 202 and requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIGS. 6 and 8. Steps may be performed serially, in a partially overlapping manner, or fully in parallel. The order in which flowchart 600 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

In some embodiments, a human or software process user 104 obtains 602 a directives document 202 from a file in digital storage 112 in which the document was previously stored 628. As examples, the human user 104 may be a developer who is writing and inspecting 604 the directives document 202, whereas the software process user may be a compiler 128 or other development-time tool that is parsing 606 the document 202. In each case, the directives document 202 is intended to help provide management of runtime behavior characteristics of types 208 and type members 210 of a computer program 120 in a runtime environment 103. Some examples of "runtime behavior characteristics" are introspection, reflection, dynamic dispatch, downcasting, self-modifying program code, dynamic type-checking, and just-in-time compilation. "Management" of these behaviors includes requiring them, allowing them, prohibiting them, and indicating whether metadata, mappings to native code, trampoline code, and/or generic instantiation are required to support 626 them.

The runtime environment 103 may be, for example, located within a smartphone or a tablet. Some environments 103 utilize 630 a reduced size runtime 136, 632, which is relatively small in comparison to familiar larger runtimes for multi-language platforms like those previously provided by Microsoft Corporation, Google, Inc., Oracle Corporation, or Xamarin, Inc., for example. Some embodiments permit programs 120 to exhibit dynamic behavior such as reflection during execution 816 yet avoid 624 reliance on JIT compilers 130.

The computer program 120 has a source code 122 which may span one or more files 132. The source code 122 is written in at least one data-typed programming language 636, e.g., a C-family language, a BASIC language, one of the Common Language Infrastructure languages such as those discussed in standards ECMA-334 and ECMA-335, or one of the many other familiar or hereafter-developed data-typed programming languages 636.

In some embodiments, the user obtains 602 the directives document by reading a directives document file that has already been generated. In some, the user obtains 602 the directives document by generating it. The directives document 202 contains human-readable directives 204 which utilize 620 a format 206 that is also parsable by software, such as an XML, JSON, YAML, or SDL format. Unlike some C# coding and other approaches which annotate source code 122 with semantic attributes, the directives 204 of the directives document 202 are not interleaved with the source code 122 of the computer program 120 to which the directives 204 pertain.

As a result of maintaining 618 this separation, access to the source code 122 by a developer 104 is not necessarily required for effective use of the directives. In particular, the program's source code is not required in order to modify 608 an applicable directives document 202 by adding a directive 204, deleting a directive 204, or altering a directive 204 by changing the type, type member, degree, and/or degree value of the directive. Maintaining 618 a separation between the source code and the directives also makes it possible for a given program 120 to be clearly subject to different directives documents 202. For example, each of several directives documents 202 for a given program can be tailored 622 to a different runtime environment 103 to reflect the availability of larger storage and/or faster processing on a workstation than on a smartphone.

Upon inspection 604 by the user, a directives document discloses one or more runtime behavior characteristic directives 204. Parsing 606 by a compiler 128 may likewise locate 612 directives 204 after the document 202 is submitted 610 to the compiler 128. For example, a directive 204 may specify 802 that a type T of the computer program source code 122 is a required type 208 in the environment 103, or that T is an optional type in the environment 103, or that T is a prohibited type in the environment 103. Similarly, another directive may specify 802 that a type member M of the computer program source code is a required type member 210 in the environment 103 is optional, or is prohibited in the environment. In some cases, a directive specifies 802 that a degree D is enabled for a type T in the environment, or specifies that D is disabled. Similarly, in some cases a directive specifies 802 that a degree D is enabled for a type member M in the environment, or specifies that D is disabled for M in the environment 103.

In some embodiments the directives 204 can be submitted directly to an innovate runtime 136 in order to simulate their impact without an intervening compilation 814. For example, the simulation runtime could be a "fat" runtime which filters dynamic access requests through a shim 228 that allows or denies the requests based on the received directives.

In some embodiments, directives 204 may be able to reference 808 a group 810 of program 120 components; some examples include these group directives 216: Application directive, Library directive, Assembly directive, Namespace directive. In some embodiments, directives may reference 808 individual components 810 of a group, such as in these group component directives 218: Type directive, TypeInstantiation directive, Method directive, a MethodInstantiation directive, Field directive, Property directive, Event directive.

In some embodiments, directives may be able to reference 808 degrees 212, such as: an activation degree which refers to runtime activation of type instances via reflection; a browse degree which refers to allowing runtime introspection over types via reflection; a dynamic degree which refers to runtime access via reflection; a runtime serialize degree which refers to enabling reflection support for reflection-based serialization and/or deserialization; or a static serialize degree with refers to statically synthesized serialization in a particular format such as XML or JSON. In some embodiments, a DataContractSerializer (DCS) class serializer is supported. In some embodiments, the runtime serialize degree enables reflection access for the type, its properties and fields for reflection-based serializers and deserializers, which distinguishes the runtime serialize degree from static serialize degree XML/DCS/JSON serialization support. In some embodiments, permitted degree values 502 in directives 204 include one or more of the following: Required-All, Required-PublicAndInternal, Required-Public, All, PublicAndInternal, Public, Included, Auto, Excluded. Within a given embodiment and environment 103, degrees may apply to types, their instance constructors, their property setters, their property getters, fields, and/or all type members. In some embodiments, degrees are automatically propagated to constituent fields and properties of a type, and then to the types of those fields and properties, and so on.

In some embodiments, directives 204 are submitted 610 to an ahead-of-time compiler 128 to indicate the following for use during compilation: whether degree D applies to type T, whether degree D applies to type member M, whether type T is required, and whether type member M is required. If a type T or type member M is not required (according to the directives document), then the compiler and the runtime can reduce space and processing requirements accordingly by omitting dynamic support 626 for T or for M, respectively. To determine what the submitted directives indicate for a given type T or a given type member M, the compiler 128 in some embodiments finds all directives that apply to T (or to M, as the case may be), applies 614 composition rules 222 to produce a composite directive 220, and then determines the result from the composite directive. The compiler 128 then compiles at least a portion of the computer program source code into native code as directed by the directives.

In some embodiments, directives can force 616 the existence of a generic instantiation, provided that the compiler 128 given the directives complies with those directives. In some embodiments, directives may make 812 indirect reference to types, by using one of the param directives 214, namely, a Parameter directive, a TypeParameter directive, or a GenericParameter directive.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as directives 204 and explicit or code-implicit directive composition rules 222, in the form of data 118 and instructions 116, read from a removable medium 114 and/or another source such as a network connection, to form a configured medium. The configured medium 112 is capable of causing a computer system to perform technical process steps for managing runtime behavior characteristics as disclosed herein. FIGS. 1 through 8 thus help illustrate configured storage media embodiments and process embodiments, as well as system and process embodiments. In particular, any of the process steps illustrated in FIG. 6 and/or FIG. 8, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion is derived in part from some Project N documentation. Project N is a multipart development project of Microsoft Corporation which includes, but is not limited to, advancements in program runtime support and compiler technology. Aspects of some Project N programs and/or documentation are consistent with or otherwise illustrate aspects of the embodiments described herein. However, it will be understood that Project N documentation and/or implementation choices do not necessarily constrain the scope of such embodiments, and likewise that Project N and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

Concrete Syntaxes

In some implementations a concrete syntax 716 of a language used in a format 206 for specifying 802 directives 204 includes a set of XML elements 224; one of skill can specify these elements 224 in an .xsd file using a general knowledge of XSD and XML when informed by the teachings herein.

In one implementation, the elements 224 and their relationships are as follows within a particular concrete syntax 716. A Directives element is the outermost element of a document, and can contain any number of Library elements and an optional Application element. A Library or Application element can contain any number of Assembly, Namespace, Type, or TypeInstantiation elements. An Assembly element can contain any number of Namespace, Type, or TypeInstantiation elements. A Namespace element can contain any number of Namespace, Type, or TypeInstantiation elements. In some implementations, if the Namespace element is not within a particular Assembly element, the Namespace element can be associated with any number of Assembly elements. A Type or TypeInstantiation element can contain any number of Type, Method, Property, Field, Event, TypeInstantiation, or MethodInstantiation elements, and a Type element can contain any number of GenericParameter elements. A Method element can contain any number of GenericParameter, TypeParameter, or Parameter elements.

In this implementation, a Directives element 224 has an attribute 226 named xmlns, which has a URI value identifying a metadata schema, e.g., a Microsoft metadata schema or another metadata schema for a program 120. A Library element 224 has an attribute 226 named Name, whose value gives the name of the library. An Application element 224 has an attribute 226 which gives the names of degrees 212. An Assembly element 224 has the following attributes 226: Name, whose value gives the name of the assembly; and an attribute 226 which gives the names of degrees 212. A Namespace element 224 has the following attributes 226: Name, whose value gives the name of the namespace; and an attribute 226 which gives the names of degrees 212. A Type element 224 has the following attributes 226: Name, whose value gives the name of the type; and an attribute 226 which gives the names of degrees 212. A TypeInstantiation element has the following attributes 226: Name, whose value gives the name of the generic type to be instantiated; Arguments, whose value gives the types to be used as arguments in the instantiation (concrete syntax of the type arguments can similar to type naming in the C# language, for example); and an attribute 226 which gives the names of degrees 212. A Field, Property, or Event element 224 has the following attributes 226: Name, whose value gives the name of the Field, Property, or Event; and an attribute 226 which gives the names of degrees 212. A Method element 224 has the following attributes 226: Name, whose value gives the name of the method; Signature, whose value gives the parameter signature of the method; and an attribute 226 which gives the names of degrees 212. A MethodInstantiation element 224 has the following attributes 226: Name, whose value gives the name of the generic method to be instantiated; Signature, whose value gives the parameter signature of the generic method to be instantiated; Arguments, whose value gives the types to be used as arguments in the instantiation; an attribute 226 which gives the names of degrees 212. A GenericParameter element 224 has the following attributes 226: Name, whose value gives the name of the generic parameter; and an attribute 226 which gives the names of degrees 212. A TypeParameter element 224 has the following attributes 226: Name, whose value gives the name of the parameter; and an attribute 226 which gives the names of degrees 212. A Parameter element 224 has the following attributes 226: Name, whose value gives the name of the parameter; an attribute 226 which gives the names of degrees 212.

In this implementation, the names of degrees that can appear as attributes 226 include but are not limited to: Activate, Browse, Dynamic, Serialize, XmlSerializer, DataContractSerializer, DataContractJsonSerializer. When the name of a degree appears as an attribute 226 of a Field, Property, Event, Method, or MethodInstantiation element, possible values 502 in this implementation are: Excluded, Auto, Included, Required. When the name of a degree appears as an attribute 226 of a GenericParameter, TypeParameter, or Parameter element 224, its possible values 502 in this implementation are: Public, PublicAndInternal, All, Required Public, Required PublicAndInternal, Required All. When the name of a degree appears as an attribute 226 of an Application, Assembly, Namespace, Type, or TypeInstantiation element 224, its possible values 502 in this implementation are: Excluded, Auto, Public, PublicAndInternal, All, Required Public, Required PublicAndInternal, Required All.

Abstract Syntax

In the context of a particular implementation, an abstract syntax 718 for directives 204 can be derived from a concrete syntax 716 by steps such as the following. Replace each use of "element" with "directive". For directives 204 that represent elements 224 that can contain other elements, introduce a Children property whose value is a set of the directives that represent the elements contained within the original element. For directives 204 that represent elements 224 other than Directives, introduce a Parent property whose value is the directive that represents the element containing the represented element. Omit the xmlns attribute of Directives. Replace each use of "attribute" with "property". Replace Signature and Arguments values with more abstract encodings of method signatures and generic arguments; "more abstract" means "less implementation-specific". Replace degree values with structured values using the mapping below.

In this abstract syntax derivation process, mappings of degree values to structured values are as follows:

Excluded→{Required=false, Inclusion=Excluded}
Auto→{Required=false, Inclusion=Auto}
Included→{Required=false, Inclusion=Included}
Required→{Required=true, Inclusion=Included}
Public→{Required=false, Inclusion=Included, Contained=Public}
PublicAndInternal→{Required=false, Inclusion=Included, Contained=PublicAndInternal}
All→{Required=false, Inclusion=Included, Contained=All}
Required Public→{Required=true, Inclusion=Included, Contained=Public}
Required PublicAndInternal→{Required=true, Inclusion=Included, Contained=PublicAndInternal}
Required All→{Required=true, Inclusion=Included, Contained=All}

A person having ordinary skill in the art of language design will be able to imagine a variety of concrete syntaxes 716 that map to such an abstract syntax 718.

Meanings of Degrees

While the precise semantics of degrees 212 may differ between implementations, the following set of degrees or a subset thereof may be of interest:

Activate: Refers to run time activation of type instances. Applies to types, their instance constructors, and property setters.

Browse: Refers to run time introspection over types. Applies to types and all type members.

Dynamic: Refers to run time access via reflection. Applies to types and all type members.

Serialize: Refers to run time serialization and deserialization via reflection. Applies to types, their instance constructors, fields, and property setters and getters. In some implementations is automatically propagated to the types of those fields and properties.

XmlSerializer: Refers to statically synthesized serialization to XML. Applies to types.

DataContractSerializer: Refers to statically synthesized serialization for DataContract. Applies to types.

DataContractJsonSerializer: Refers to statically synthesized serialization for DataContract using JSON as a format. Applies to types.

In some cases, degrees can be added or removed without making any changes to existing documents 202. To satisfy the semantic requirements of particular degrees, one may introduce rules to automatically propagate degrees to types or members not annotated by this mechanism, as discussed for example in the incorporated disclosure of the '036 application.

Directive Application and Composition

In some embodiments, a directives document 202 answers the following questions: Does degree D apply to type T or type member M? Is type T or type member M required? Answering any of these questions may involve these steps: Locate 612 all directives 204 that apply to T or M; apply 614 composition rules 222 to the applicable directives to produce a composite directive 220; determine 642 the answer from the composite directive. Directive application and composition are each discussed below in greater detail.

Directive Application

In some embodiments, a directive 204 applies to a type T if one of these conditions holds:

The directive is Application.

The directive is Namespace, has no direct or indirect parent that is Assembly, and the full namespace name of the directive matches a leading substring of the full name of T.

The directive is Assembly and the Name property of the directive matches the name of the assembly containing T. Wildcarding is possible in some implementations to avoid the need for an exact match.

The directive is Namespace, has a direct or indirect Parent that is Assembly with a Name that matches the name of the assembly containing T, and the full namespace name of the directive matches a leading substring of the full name of T.

T is not a generic instantiation, the directive is Type, has a direct or indirect Parent that is Assembly with a Name that matches the name of the assembly containing T, and the full type name of the directive matches the full name of T or a leading substring of the full name of T.

T is a generic instantiation, the directive is TypeInstantiation, the directive interpreted as Type applies to the uninstantiated generic type of T, and the Arguments property of the directive denotes a list of types equivalent to the argument types of T.

The directive is GenericParameter, and T occurs as a generic argument that matches the generic parameter named by the Name property of the directive in an instantiation of a type or method to which the Parent of the directive applies.

The directive is Parameter, and T occurs as the static type of an argument that matches the parameter named by the Name property of the directive in a call to a method to which the Parent of the directive applies.

The directive is Type Parameter, and T occurs as the operand to a TypeOf expression that is an argument that matches the parameter named by the Name property of the directive in a call the a method to which the Parent of the directive applies. In an alternate approach, TypeParameter handling is enhanced to permit finding out the value of a System.Type in other ways, such as tracking whether a typeof was used in calling a method that calls the marked method.

In some embodiments, a directive applies to a member M if one of these conditions holds:
- The directive applies to the type containing M.
- M is a field, property, event, or method, the directive is the corresponding Field, Property, Event or Method, the Parent of the directive applies to the type containing M, the Name property of the directive matches the name of M, and either M is not a method, or the directive has no Signature property, or the Signature property matches the parameter signature of M.

In some embodiments, the full namespace name of a Namespace directive is determined thus:
- If the Parent property of the directive is Application, Library, or Assembly, the full namespace name of the directive is the value of the Name property of the directive.
- Otherwise, the Parent property of the directive must be Namespace, and the full namespace name of the directive is the full namespace name of the Parent concatenated with "." concatenated with the value of the Name property of the directive.

In some embodiments, the full type name of a Type directive is determined thus:
- If the Parent property of the directive is Application, Library, or Assembly, the full type name of the directive is the value of the Name property of the directive.
- If the Parent property of the directive is Namespace, the full type name of the directive is the full namespace name of the Parent concatenated with "." concatenated with the value of the Name property of the directive.
- If the Parent property of the directive is Type or TypeInstantiation, the full type name of the directive is the full type name of the Parent concatenated with "." concatenated with the value of the Name property of the directive.
- The full type name of a TypeInstantiation directive is the full type name of the directive interpreted as Type concatenated with "<" concatenated with a comma-separated list of the full type names of the argument types concatenated with ">".
- In some implementations, the full name of a type is as specified by the C# language.

Directive Composition

In some embodiments, forming the composition of the set of directives that apply to a type T or a member M proceeds according to the following rules 222:
- If no directives apply to T or M, the composition is empty.
- If exactly one directive applies to T or M, the composition is that directive.
- If more than one directive applies to T or M, two of the directives are chosen for composition and then composed, and then the two directives are replaced with the composition. Repeat until exactly one directive remains, and that is the composition.

Also, to choose two directives for composition, sort the directives into a partial order, in which a directive precedes any directive that is its direct or indirect Parent, and choose the first two directives. If directive D1 has directive D2 as a direct or indirect Parent, the composition of D1 and D2 is formed using these rules 222:
- If a given degree DG is present in D1, the value of DG in the composition is the value of DG in D1.
- Otherwise, if DG is present in D2, the value of DG in the composition is the value of DG in D2.
- Otherwise, DG is not present in the composition.
- The composition has the same Parent as the Parent of D2.

In some embodiments, if neither of directives D1 and D2 has the other as a direct or indirect Parent, the composition of D1 and D2 is formed using these rules 222:
- If a given degree DG is present in D1 and not in D2, the value of DG in the composition is the value of DG in D1.
- If DG is present in D2 and not in D1, the value of DG in the composition is the value of DG in D2.
- If DG is present in both D1 and D2, the value of DG in the composition is the composition of the values of DG in D1 and D2.

In some embodiments, the composition of degree values V1 and V2 is formed using these rules 222:
- If either V1 or V2 has Inclusion=Excluded, the composition is {Required=false, Inclusion=Excluded}.
- Otherwise, if either V1 or V2 has Required=true, the composition has Required=true, and otherwise has Required=false.
- If either V1 or V2 has Inclusion=Included and neither has Inclusion=Excluded, the composition has Inclusion=Included.
- If neither V1 nor V2 has Inclusion=Included or Inclusion=Excluded, the composition has Inclusion=Auto.

Also, in some embodiments if a directive D applies to a type T or member M by means other than applying directly to T or M, for any degree DG in D for which T or M does not satisfy the visibility requirements, the value of DG in D for T or M is {Required=false, Inclusion=Excluded}. In some embodiments, the result would be Inclusion=Included; that is, if a directive says Dynamic="Public" for a type, it is permitted for another directive to say Dynamic="RequiredAll".

Required Types and Members

In some embodiments, if the composition of the directives that apply to a type or member have Required=true for any degree, the type or member is required. The meaning of being required is determined by the compiler 128 and/or other parts of a system interpreting 642 the directives, but is likely to be that the type or member cannot be discarded. In particular, if a generic type instantiation or generic method instantiation is required, the system interpreting the directives can be expected to force 616 the instantiation to exist.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 6 and 8 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A management process performed by a processor for managing runtime behavior characteristics of types and type members of a computer program in an environment, the computer program having a source code which is written in at least one data-typed programming language, the process comprising the steps of:

a management process executed by the processor obtaining from at least one digital storage device a directives document; and the management process executed by the processor inspecting the directives document for directives which include a plurality of runtime behavior characteristic directives selected from the following:

directives which specify that a type T of the computer program source code is a required type, an optional type, or a prohibited type in the environment, directives which specify that a type member M of the computer program source code is a required type member, an optional type member, or a prohibited type member in the environment, and directives which specify that a degree D is enabled or disabled for a type T or a type member M in the environment.

2. The process of claim 1, wherein at least one of the following occurs:

the inspecting step discloses in the directives document at least three runtime behavior characteristic directives;

the inspecting step discloses in the directives document at least two kinds of runtime behavior characteristic directives;

the inspecting step discloses in the directives document at least one of the following param runtime behavior characteristic directives: a Parameter directive, a TypeParameter directive, or a GenericParameter directive; or the inspecting step discloses in the directives document at least one of the following group runtime behavior characteristic directives: an Application directive, a Library directive, an Assembly directive, or a Namespace directive.

3. The process of claim 1, wherein the inspecting step discloses that at least one of the runtime behavior characteristic directives is written in at least one of the following human-readable formats which is also parsable by software: an XML format, a JSON format, a YAML format, or an SDL format.

4. The process of claim 1, further comprising modifying the directives document by at least one of the following acts: adding a directive, deleting a directive, or altering a directive.

5. The process of claim 1, further comprising submitting the directives document to a compiler to manage at least one runtime behavior characteristic of the computer program in at least one of the following environments: a smartphone environment, or a tablet environment.

6. A computer-readable storage medium configured with data and with instructions that when executed by at least one processor cause the processor(s) to perform a technical process for managing characteristics in an environment, the computer program having a source code which is written in at least one data-typed programming language, the process comprising the steps of:

electronically obtaining in a volatile digital memory a directives document containing directives which are not interleaved with computer program source code;

software parsing the directives document and thereby locating at least one directive; and submitting at least a portion of parsing step results to a compiler to manage at least one runtime behavior characteristic of the computer program in the environment.

7. The computer-readable storage medium of claim 6, wherein the parsing step locates at least one of the following param runtime behavior characteristic directives: a Parameter directive, a TypeParameter directive, or a GenericParameter directive.

8. The computer-readable storage medium of claim 6, wherein the parsing step locates at least one runtime behavior characteristic directive that recites at least one of the following degrees:
an activation degree which refers to runtime activation of type instances;
a browse degree which refers to runtime introspection over types;
a dynamic reflection degree which refers to runtime access via reflection; or
a runtime serialization degree which refers to runtime serialization and/or deserialization.

9. The computer-readable storage medium of claim 6, wherein the parsing step locates at least one runtime behavior characteristic directive reciting a degree which has one of the following degree values: excluded, included, or required.

10. The computer-readable storage medium of claim 6, wherein the parsing step locates at least one of the following group runtime behavior characteristic directives: an Application directive, a Library directive, an Assembly directive, or a Namespace directive.

11. The computer-readable storage medium of claim 6, wherein the parsing step locates at least one of the following group component runtime behavior characteristic directives: a Type directive, a TypeInstantiation directive, a Method directive, a MethodInstantiation directive, a Field directive, a Property directive, or an Event directive.

12. The computer-readable storage medium of claim 6, wherein the process further comprises applying at least one composition rule to at least two runtime behavior characteristic directives to produce a composite runtime behavior characteristic directive.

13. The computer-readable storage medium of claim 6, wherein the process further comprises forcing an existence of a generic instantiation in response to at least one runtime behavior characteristic directive.

14. A computer system comprising:
a logical processor;
a memory in operable communication with the logical processor;
a computer program source code residing in at least one source code file in the memory, the computer program source code written in one or more programming languages;
a compiler; and
a directives document residing in the memory outside a portion of the computer program source code and having runtime behavior characteristic directives which are written in a software-parsable format and are not written in the programming languages; and wherein upon execution by the logical processor(s) the compiler compiles at least a compilation portion of the computer program source code from the source code file(s) as directed by the directives document, including performing at least one of the following: (a) making a type T of the computer program source code be a required type, an optional type, or a prohibited type in the environment, (b) making a type member M of the computer program source code be a required type member, an optional type member, or a prohibited type member in the environment, or (c) enabling or disabling a degree D for a type T or a type member M in the environment.

15. The system of claim 14, wherein the directives document comprises at least one of the following param runtime behavior characteristic directives: a Parameter directive, a TypeParameter directive, or a GenericParameter directive.

16. The system of claim 14, wherein the directives document comprises at least one of the following group runtime behavior characteristic directives: an Application directive, a Library directive, an Assembly directive, or a Namespace directive.

17. The system of claim 14, wherein the directives document comprises at least three of the following group component runtime behavior characteristic directives: a Type directive, a TypeInstantiation directive, a Method directive, a MethodInstantiation directive, a Field directive, a Property directive, or an Event directive.

18. The system of claim 14, wherein the compiler executes instructions which perform at least one of the following: apply at least one composition rule to at least two runtime behavior characteristic directives to produce a composite runtime behavior characteristic directive, or output native code instantiating a generic parameter in response to at least one runtime behavior characteristic directive.

19. The system of claim 14, wherein the directives document comprises runtime behavior characteristic directives which recite at least two of the following degree values: Required-All, Required-PublicAndInternal, Required-Public, All, PublicAndInternal, Public, Included, Auto, or Excluded.

20. The system of claim 14, wherein the directives document comprises runtime behavior characteristic directives written in at least one of the following formats: an XML format, a JSON format, a YAML format, or an SDL format.

* * * * *